United States Patent [19]
Zanker

[11] 3,720,104
[45] March 13, 1973

[54] FLOWMETERS
[75] Inventor: Klaus Joachim Zanker, Streatley, Bedfordshire, England
[73] Assignee: Kent Instruments Limited, Luton, England
[22] Filed: Aug. 17, 1970
[21] Appl. No.: 64,365

[30] Foreign Application Priority Data

Aug. 20, 1969 Great Britain.....................41,629/69

[52] U.S. Cl. ..............................................73/194 B
[51] Int. Cl............................G01f 1/00, G01p 5/00
[58] Field of Search........................................73/194

[56] References Cited

UNITED STATES PATENTS

| | | | |
|---|---|---|---|
| 2,809,520 | 10/1957 | Richard, Jr............................ | 73/194 |
| 2,519,015 | 8/1950 | Bensen................................... | 340/27 |
| 1,935,445 | 11/1933 | Heinz..................................... | 73/194 |
| 2,813,424 | 11/1957 | Liepmann et al...................... | 73/194 |
| 3,090,239 | 5/1963 | Dacus..................................... | 73/517 |
| 2,299,406 | 10/1942 | Potter..................................... | 73/231 |
| 3,116,639 | 1/1964 | Bird........................................ | 73/194 |
| 3,273,389 | 9/1966 | Waugh................................... | 73/194 |

Primary Examiner—Jerry W. Myracle
Assistant Examiner—Herbert Goldstein
Attorney—Young & Thompson

[57] ABSTRACT

A device for measuring the velocity of a fluid flowing along a duct comprising a generally cylindrical member positioned in the duct for bodily oscillatory movement at right angles to the fluid flow in response to streams of periodic eddies generated by fluid flow therepast, and transducer means for providing a signal in response to such oscillatory movement. The member is situated and arranged so that the bodily motion thereof gives rise to a coherent two-dimensional eddy pattern in the flowing fluid. The member may be positioned in the duct by one or more flexures, by a plurality of springs, or by a magnetic levitation.

5 Claims, 11 Drawing Figures

PATENTED MAR 13 1973 3,720,104

INVENTOR
KLAUS JOACHIM ZANKER
By Young & Thompson
ATTYS.

3,720,104

INVENTOR
KLAUS JOACHIM ZANKER
By Young & Thompson
ATTYS.

FLOWMETERS

This invention relates to devices for measuring fluid flow velocities and more particularly to such a device utilizing vortex generation caused by fluid flow past an obstacle.

It is known that when a fluid stream flows past an obstacle, such as a cylinder, then over a range of fluid velocities, two periodic streams of vortices or eddies are produced in the wake of the obstacle, one stream from each side. It is believed, for example, that it is this effect that causes a flag mounted on a flag pole to flutter in response to eddies generated by wind flowing past the flag pole.

Velocity meters using this principle are known. One known form of meter includes a flow responsive member, such as a fixed cylinder, for generating eddies in a moving stream of fluid in a pipe, and a separate detector, such as a flag, pivotally mounted so as to oscillate in accordance with the eddies produced, such oscillation being transmitted mechanically to frequency sensing means outside the pipe. In other known form the obstacle cylinder is itself pivotally mounted about an axis perpendicular to its own longitudinal axis to oscillate in accordance with the eddies produced, the oscillation again being transmitted mechanically to frequency sensing means outside the pipe.

Such velocity meters have a number of disadvantages. Bearings must be provided for the pivotal mounting of the oscillating member, and as these mountings necessarily extend through the side of the pipe in which the device is mounted, seals must also be provided.

Another known velocity meter using the vortex generation effect includes an obstacle cylinder having an axially short portion positioned between aligned fixed portions the central short portion being free to move bodily in response to the generation of vortices caused by fluid flow past the cylinder. In such a device, due to the fact that the major part of the cylinder is stationary, a non-coherent vortex pattern is produced, for the reasons explained in detail below.

It is the object of the invention to provide an improved device for measuring the velocity of a fluid flowing along a duct.

The present invention accordingly provides a device for measuring the velocity of a fluid flowing along a duct, the device comprising a flow responsive member positioned within the duct for oscillatory bodily movement substantially at right angles to the flow direction in response to eddies generated by fluid flow past the member, and transducer means arranged to provide a signal in response to the oscillatory movement, the member being situated and arranged so that the bodily motion of said member gives rise to a coherent two dimensional eddy pattern in the flowing fluid.

The invention also provides a device for measuring the velocity of a fluid flowing along a duct, the device comprising an elongated flow responsive member, means for positioning the member in the duct with the longitudinal axis of the member substantially perpendicular to the flow direction, the positioning means permitting oscillatory bodily movement of the member in a direction substantially perpendicular to the axis and to the direction of fluid flow in response to eddies generated by fluid flow past the member, and transducer means arranged to provide a signal in response to the oscillatory movement of the member, the member extending across at least the major portion of the width of the duct, the bodily movement of the flow responsive member giving rise to a coherent eddy pattern along the length thereof.

The positioning means, according to preferred forms of the invention, comprises magnetic means for suspending the flow responsive member by magnetic levitation, or one or more flexures permitting only the oscillatory movement of the flow responsive member, or an array of springs again permitting only the oscillatory movement of the flow responsive member.

The transducer means may be of any form suitable for providing a signal in response to said oscillation of the flow responsive member although a displacement sensitive transducer is particularly suitable due to the constant amplitude/frequency characteristic of the elongated flow responsive member. Different types of transducer which are suitable in different applications are discussed below.

The invention will be better understood from the following description of illustrative embodiments thereof, which are given by way of example only, and by reference to the accompanying drawings, in which.

Figure 1:
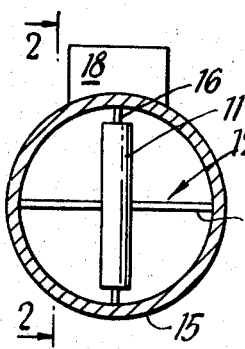
FIG. 1 shows a fluid flow velocity measuring device embodying the invention, viewed from the downstream direction.
Figure 2:
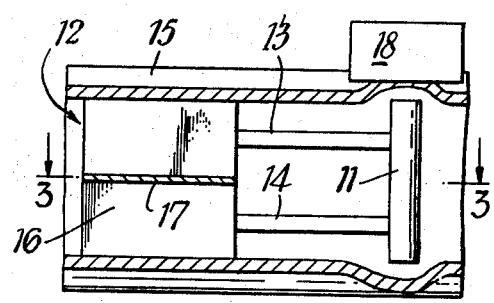
FIG. 2 is a sectional side view of the arrangement of FIG. 1, taken substantially on the line 2—2 of FIG. 1.
Figure 3:
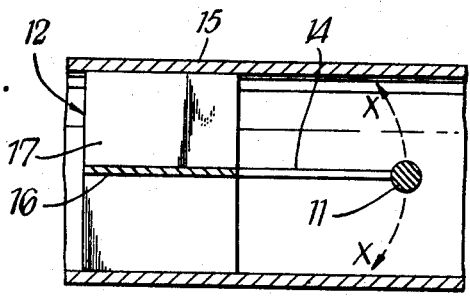
FIG. 3 is a sectional top plan view of the arrangement of FIG. 1, taken on the line 3—3 of FIG. 2.

In the embodiment of FIGS. 1 to 3, a cylindrical flow responsive member 11 which is circular in cross-section is attached by two mounting flexures 13 and 14 to a fixed structure 12 of cruciform cross-section secured inside a duct 15. As can best be seen from FIG. 1, the cylinder 11 extends across the major portion of the diameter of the duct 15.

The cruciform structure 12 is formed from two mutually perpendicular plate-like members 16, 17, and, as well as providing a mounting for the flow responsive member 11, it also acts as a flow straightener, wholly or partially removing swirl from fluid flowing in the duct 15.

The mounting flexures 13 and 14 are of very low stiffness in a plane which includes the flow direction so that the cylinder 11 is free to oscillate in a direction substantially transversely of the flow direction, as shown at X—X in FIG. 3.

In use, fluid flows through the pipe 15, from the left to the right in FIGS. 2 and 3, and, over at least a range of velocities, two streams of eddies or vortices detach themselves from each side of the cylinder 11. A pulsating force is thus exerted on the cylinder 11 by the fluid, causing it to oscillate in the direction X—X, at the same frequency at which the eddies are generated.

The pattern of eddies generated with an elongated flow responsive member mounted for bodily movement is coherent along the length thereof, for the reasons described below. With a fixed cylinder, or a cylinder of which the major part is fixed, as provided in the prior art arrangements discussed above, the flow past the cylinder is divided into so-called "cells" along the length thereof, in each of which vortex generation occurs which is distinct from the vortex generation in the adjacent cells. Thus, the streams of vortices produced in each cell are not necessarily of exactly the same frequency, and are certainly not of the same phase, and the flow pattern varies in three dimensions.

Furthermore, the separation points of the vortices vary between the different cells in response to the flow velocity profile, and can also vary with time. It will thus be apparent that the eddy pattern produced along the length of such a fixed cylinder is non-coherent and, in consequence, that the output from a transducer responsive to the vortices and located downstream of the cylinder will vary in amplitude and also in frequency. The output would also vary at different positions of the transducer across the direction of flow. However, with the arrangement of the present invention, due to the fact that the cylinder is moving bodily, the eddies are positively detached along the whole length of the cylinder at substantially the same instant in the cycle of oscillation, and a coherent two dimensional eddy pattern, i.e., a pattern of uniform phase and frequency is thus established in the moving fluid. Consequently, for steady state flow conditions, the oscillatory force on the cylinder is likewise coherent and leads to an oscillation of constant, stable peak amplitude. The arrangement may be considered to employ positive feedback to provide the stable oscillation, in that the coherent eddy pattern generated provides a coherent oscillatory force on the cylinder which in turn renders the eddy generation pattern coherent. As discussed below, this peak amplitude is substantially constant over a large range of fluid flow velocities, thus simplifying detection of the oscillation, and rendering the employment of a displacement type transducer particularly suitable.

Two non-dimensional groups are used in analyzing this oscillatory motion, viz. the Strouhal number (STR) and Reynold's number (Re), which are defined as follows:

$$STR = (f.d/v\ f.d)/v \text{ and } Re = (v.d.\rho)/\mu$$

where $v$ = the velocity of flow of the fluid;
$f$ = the frequency of the eddies generated;
$d$ = the diameter of the cylinder; and
$\rho$ and $\mu$ = the density and viscosity of the fluid respectively.

Figure 4:
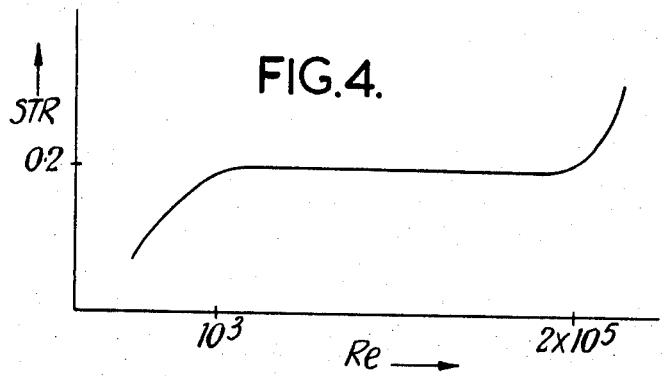
FIG. 4 is a graph showing a typical variation of the Strouhal number (STR) with Reynold's number (Re) for a fluid flowing past a cylinder.

FIG. 4 is a graph showing an example of the relationship between these two non-dimensional groups for a device of this type.

It can be seen that over a range of Reynold's numbers, $10^3$ to $2 \times 10^5$ in this case, the Strouhal Number (STR) is substantially constant, and thus, over this range, the frequency of oscillation $f$ is substantially linearly proportional to the fluid flow velocity $v$. Thus, the frequency of oscillation of the cylinder 11, over this range, will be substantially linearly proportional to the velocity of flow of the fluid in the pipe.

Once a steady-state oscillation has been set up, the balance of forces acting on the cylinder 11 can, by the application of Newton's laws, be established as:

$$(A.C_L' .\rho.v^2)/2 = M.a.\omega^2 .\sin \omega t$$

$C_L'$ = the lift coefficient for the fluctuating force on the cylinder 11;
$M$ = the effective mass of the cylinder 11;
$a$ = the amplitude of the oscillations of the cylinder 11;
$\omega$ = the instantaneous angular velocity of the center of mass of the cylinder 11;
$t$ = time; and
$A$ = typical area of the cylinder.

The other symbols have the same designations as used above.

It can thus be seen that as, for the range of velocities considered, the fluid flow velocity $v$ is linearly proportional to the frequency of oscillation $f$, and hence to $\omega$, for constant $C_L'$, $a$ is also constant, i.e. the amplitude of oscillation is substantially independent of both $v$ and $\omega$. This constant amplitude/frequency characteristic simplifies detection of the frequency of oscillation and renders the use of displacement sensitive transducers particularly appropriate.

It can also be shown that the force on the cylinder varies with the ratio $a:d$ and rises to a maximum when said ratio is in the order of 1:10. Consequently, the structure positioning the cylinder in the duct is desirably designed to allow the cylinder to oscillate with a peak amplitude of about one tenth of its diameter.

The effects of resonances in the structure mounting the flow responsive member may adversely affect the theoretically linear frequency/velocity characteristic. Such resonances modulate the constant amplitude output in a highly undesirable manner, producing, for example, beats. In the worst case, when the frequency of the generated eddies approaches the resonant frequency of the combination of the cylinder 11 and the flexures 13 and 14, the oscillation frequency of the cylinder will be "pulled" towards the resonant frequency over about 10 percent of its range. The structure will thus, of course, be designed so that major resonances lie outside of the active frequency range of the device, but remanent minor resonances may still give rise to irregularities in the frequency/speed characteristic. To combat these, a certain amount of damping of the oscillatory movement is designed into the structure. In the embodiment of FIGS. 1–3, and in the embodiments described below, the effect of the cylinder and any other movable parts moving through the liquid provides viscous damping.

The frequency of oscillation of the cylinder can be monitored in any convenient way. As shown, an acousto-electric transducer 18 can be mounted externally of the duct 15. Such a transducer could instead be mounted inside the duct.

Alternatively, electrodes can be mounted at suitable positions inside the duct 15, to a fixed or an oscillating part, or to each, so that the frequency can be detected by monitoring local changes in electrical properties between the electrodes due to the oscillation. Suitable properties are resistance, capacitance and inductance.

Instead, a strain gauge attached to one or each of the mounting flexures 13, 14, could be employed as a transducer to monitor the oscillation.

Yet another possible transducer comprises at least one magnet attached to the cylinder 11 or to a flexure 13, 14 and a Hall effect type device such as a magnetic dependent resistor arranged outside of the duct 15 to detect the oscillation of the magnetic field of the magnet caused by the oscillatory movement. Instead of attaching a magnet, the flexure member or cylinder or parts thereof can be magnetized to provide the same effect.

Figure 5:
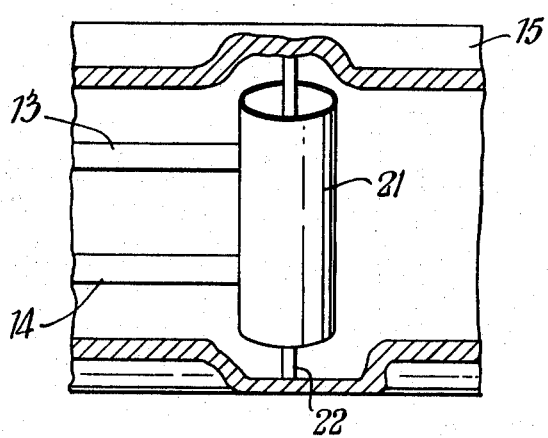
FIG. 5 is a sectional view of a second embodiment of the invention, corresponding to FIG. 2, on an enlarged scale.

An alternative embodiment of the invention is illustrated in FIG. 5, where the same reference numerals as those used in the first embodiment have been used for like parts.

In this embodiment, the flow responsive member is a hollow cylinder 21. A rod 22, attached at one or both ends to the duct, extends axially through the cylinder 21, as shown.

The stiffness of the mounting flexures 13 and 14, and the dimensions of the cylinder 21 and the rod 22, are chosen so that the rod and cylinder do not normally come into contact. It will be appreciated that if electrodes are attached to the rod 22 and cylinder 21, or, alternatively, if the rod and the cylinder themselves serve as electrodes, monitoring the oscillation frequency by monitoring location variations in electrical properties, such as the capacitance between the cylinder and the rod, is simplified.

The rod 22 and cylinder 21 may be arranged so that in the event of excessive travel of the cylinder, the rod prevents the cylinder from contacting the wall of the duct 15.

Figure 6:
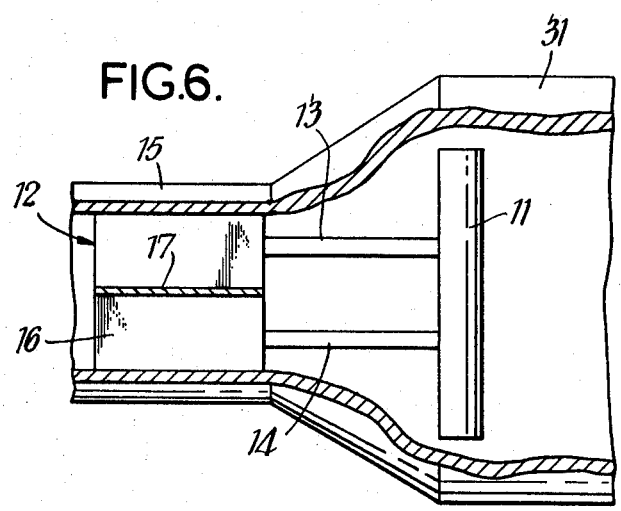
FIG. 6 is a view, corresponding to FIG. 2, of a further embodiment wherein the flow responsive member is mounted in a diffuser.

FIG. 6 shows an embodiment resembling that of FIGS. 1 to 3 with the flow responsive member 11 mounted in a diffuser 31, i.e., in a portion of the duct of which the cross-sectional area increases in the flow direction. Such an arrangement is thought to cause increased instability and consequent generation of eddies at a lower Reynold's number and hence at a lower velocity than does the arrangement of FIGS. 1 to 3.

Figure 7:
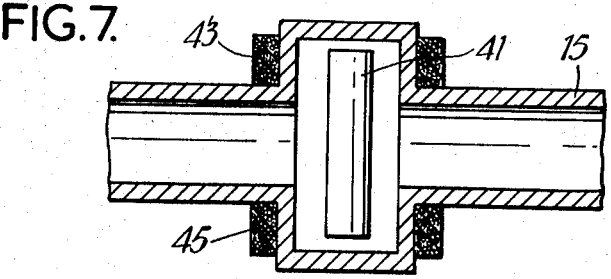
FIG. 7 is a sectional side view of another embodiment of the invention.

A further embodiment of the invention is shown in FIG. 7. In this embodiment, a flow responsive cylinder 41 is held suspended in the flow as shown by magnetic levitation provided by a.c. excited electromagnets comprising coils 43, 45 encircling diametrically opposed bosses in the duct 15. The cylinder, of course, must be at least partly of a ferramagnetic material.

In this embodiment, damping of the oscillatory movement is provided magnetically by the magnetic circuits. Instead of using one of the transducer arrangements described above, oscillation of the cylinder 41 can be detected by monitoring the resultant variation in the current supplying the electromagnets 43 and 45.

Figure 8:
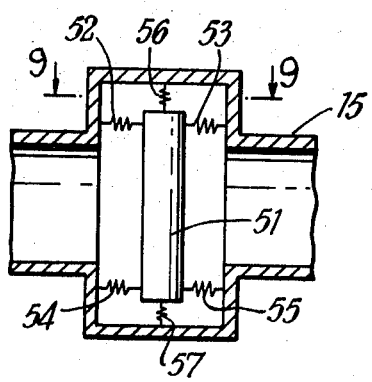
FIG. 8 is a sectional side view of yet a further embodiment.
Figure 9:
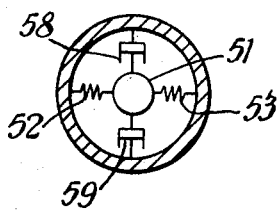
FIG. 9 is a sectional view taken on the line 9—9 of FIG. 8.

In the embodiment of FIGS. 8 and 9, a flow responsive cylinder 51 is suspended in the duct 15 by springs 52–57. All these springs are sufficiently hard to substantially prevent movement of the cylinder 51 in the direction of flow and in the direction perpendicular to the plane of FIG. 9, whilst allowing the cylinder to oscillate in the direction perpendicular to the plane of FIG. 8 in response to the generation of eddies.

Damping of the oscillatory movement is provided by damping means schematically shown in FIG. 9 as dashpots 58, 59. In practice, the damping is provided by a deformable material such as a plastics foam or a rubber inserted into the bosses around the ends of the cylinder.

Figure 10:
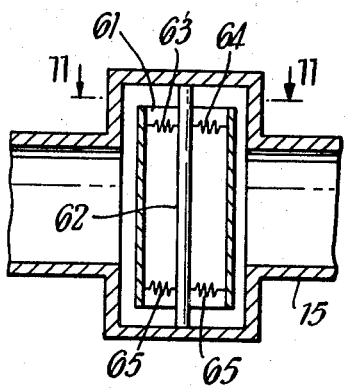
FIG. 10 is a sectional side view of still another embodiment.
Figure 11:
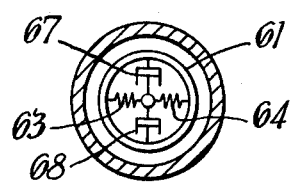
FIG. 11 is a sectional view taken on the line 11—11 of FIG. 10.

The embodiment of FIGS. 10 and 11 is broadly similar to that of FIGS. 8 and 9. In this case, a hollow flow responsive cylinder 61 is mounted by hard springs 63–66 to a rod 62 which is attached to the duct 15 and passes axially through the cylinder. Here again, damping is schematically shown by dashpots 67, 68. In this embodiment, the liquid between the rod 62 and the inside of the cylinder 61 will provide a certain amount of damping, although deformable material, as used for the previous embodiment, may be added if necessary.

Transducer means of the types discussed hereinabove with reference to the embodiment of FIGS. 1, 2 and 3 may be used to provide signals in response to oscillation of the flow responsive members 51 and 61 in the embodiments of FIGS. 8 and 9, and 10 and 11.

In all the embodiments, it is desirable that the flow responsive member presents to the flow an area which is not too large with respect to the internal cross-sectional area of the duct, so as to ensure a low pressure loss. However, as the magnitude of the desired eddies formed is of the same order of magnitude as the diameter of the flow responsive member, it is desirable that the member is large with respect to typical turbulent eddy linear dimensions so that the turbulent eddies are much smaller than the desired ones, and thus do not substantially hinder the frequency detection process by generating a larger amount of spurious acoustic or electrical noise. An arrangement with a cylinder diameter/duct internal diameter ratio of 1:3 has been found satisfactory. It is similarly advantageous that the cylinder has a high inertia, thus acting as a filter of such turbulent noise.

In this connection, the possibility of using displacement sensitive transducers provided by the present invention compares favorably with the use of hot-wire or pressure detector devices for measuring eddy frequencies as used in the prior art. With both of the devices the noise level will be high and may obscure the signal. Furthermore, these devices have the disadvantage that the detected signal will be proportional to the fourth and second powers of the fluid velocity respectively, whereas the amplitude of the signal detected in the present invention, over the said limited range, is substantially independent of velocity.

It will be appreciated that the range of fluid velocities in a particular application may fall outside of the above-mentioned linear range. To overcome this disadvantage, the flow responsive member may be mounted in a portion of the duct of which the cross-sectional area is increasing or decreasing. The cross-sectional area at the position of the member is chosen relative to the normal area of the duct so that the range of velocities is shifted, in this portion, into the linear region.

Although the flow responsive members described herein are circular and uniform in cross-section, this is not essential. The member is preferably generally rod-like but its cross-section need not be circular nor need it be strictly uniform. For example, the flow responsive member may have a generally triangular cross section, with one face of the member being normal to the fluid flow direction, whereby separation of the two streams of vortices will occur along the two edges of this face. In general, a bluff body may be used for low Reynold's number flow and a streamlined body for high Reynold's number flow.

I claim:

1. A device for measuring the velocity of a fluid flowing along a duct, comprising: positioning means fixed relative to said duct; and elongated cylindrical flow-responsive member mounted substantially at right angles to the flow direction in said duct by said positioning means so as to extend across at least the major portion of the width of the duct, said positioning means comprising a structure mounted in said duct upstream of said flow-responsive member and at least one flexure strip of low stiffness in a single plane from end to end of said strip, said plane including the flow direction, one end of said strip being attached to said structure and the other end being attached to and supporting said flow-responsive member whereby said member can carry out bodily oscillatory movement substantially at right angles to said plane; and transducer means responsive to said bodily oscillatory movement of said flow-responsive member to provide an oscillatory signal.

2. A device according to claim 1, in which said structure is a flow straightener.

3. A device according to claim 1 in which said duct has a section in which the cross-sectional area increases in the flow direction and said positioning means is adapted to position said flow responsive member in said section of the duct.

4. A device for measuring the velocity of a fluid flowing along a duct, comprising: positioning means fixed relative to said duct; an elongated flow-responsive member mounted substantially at right angles to the flow direction in said duct by said positioning means so as to extend across at least the major portion of the width of the duct, said positioning means being adapted to permit bodily oscillatory movement of said flow-responsive member in a direction substantially at right angles to both the flow direction and the axis of the member, in response to vortices generated by fluid flow past the member; and transducer means responsive to said bodily oscillatory movement of said flow-responsive member to provide an oscillatory signal, said flow-responsive member being composed at least in part of ferromagnetic material and said positioning means comprising magnetic means mounted on said duct and adapted to support the member inside the duct by magnetic levitation.

5. A device according to claim 4, in which said magnetic means comprises a pair of magnets mounted on the duct each adjacent a respective end of said flow-responsive member.

* * * * *